Figure 1:
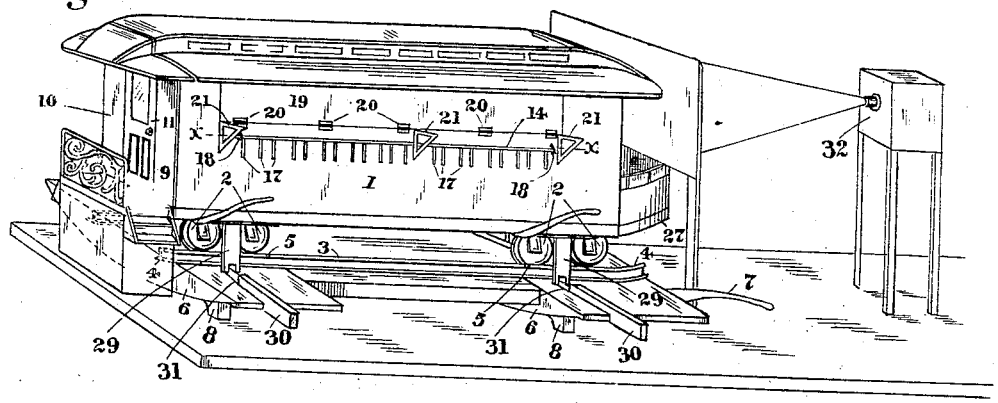

No. 865,882. PATENTED SEPT. 10, 1907.
J. E. GARRETTE.
COMBINATION AMUSEMENT VEHICLE AND BOAT.
APPLICATION FILED MAR. 24, 1906.

Witnesses.
Harry Henkr
M. E. Glass

Inventor:
John E. Garrette
By James N. Ramsey
Attorney.

UNITED STATES PATENT OFFICE.

JOHN E. GARRETTE, OF INDIANAPOLIS, INDIANA, ASSIGNOR, BY DIRECT AND MESNE ASSIGNMENTS, OF ONE-THIRD TO WILLIAM C. WITZ AND ONE-THIRD TO WILLIAM H. LUEDERS, BOTH OF CINCINNATI, OHIO.

COMBINATION AMUSEMENT VEHICLE AND BOAT.

No. 865,882.      Specification of Letters Patent.      Patented Sept. 10, 1907.

Application filed March 24, 1906. Serial No. 307,828.

*To all whom it may concern:*

Be it known that I, JOHN E. GARRETTE, a citizen of the United States, residing at Indianapolis, in the county of Marion and State of Indiana, have invented a certain new and useful Combination Amusement Vehicle and Boat, of which the following is a specification.

My invention relates to a combination conveyance adapted to represent an amusement vehicle and boat alternately.

The object of my invention is to produce an illusion by means of a moving conveyance which gives the impression of a fast moving vehicle upon wheels over a track by slow longitudinal movement of the vehicle in conjunction with rapidly moving pictures and objects exposed to the view of spectators seated therein and which conveyance is quickly transformed and given a laterally tilting or rocking movement in conjunction with suitable objects and views whereby an illusive impression is made upon the spectators seated therein that they are being conveyed upon a moving boat.

My invention consists in providing an amusement conveyance constructed to imitate a passenger car mounted upon a short track having notches at suitable intervals upon its upper surface and lateral curves therein preferably near its ends to assist in producing the illusion of a rapidly moving car, in having said tracks curved upwardly at each end to form stops to limit the longitudinal movement and to assist in giving impetus to the return movement of the car, in having the body of the car detachable from the rear end, including entrance platform and door, and in having a large observation opening in the front end of the car in conjunction with a screen disposed in front thereof and adapted to display moving pictures, in fixing said track upon rockers adapted to be held firmly when said conveyance is used to represent a passenger car, in means for transforming the appearance of the conveyance from a passenger car to a boat, in means for releasing said rockers from said firm position and giving a laterally rocking or tilting movement to the conveyance mounted upon the track, in means for limiting said lateral or rocking movement, in means for engaging said conveyance with said rockers to hold it from longitudinal movement upon the track while being rocked and suitable moving pictures and objects arranged in conjunction with said conveyance when used to represent a boat.

My invention also consists in the parts and in the construction, combination and arrangement of parts as herein set forth and claimed.

Figure 2:
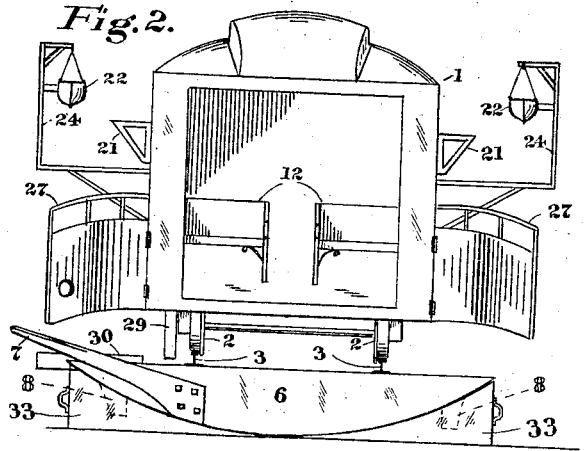
Figure 3:
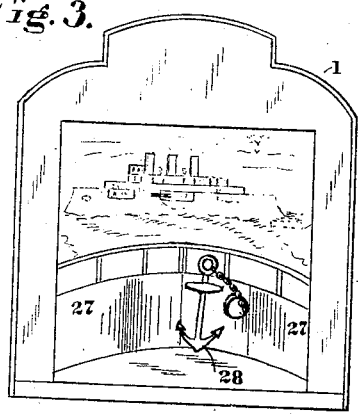
Figure 4:
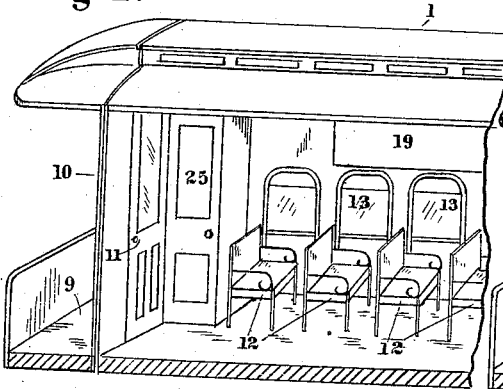
Figure 5:
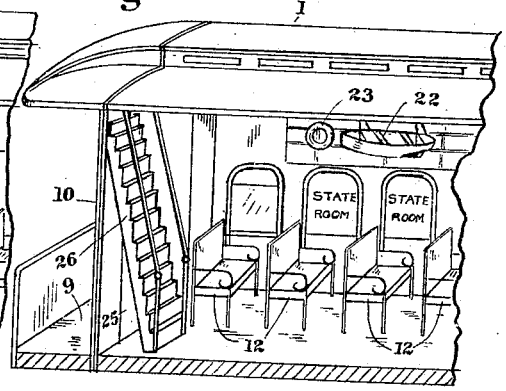
Figure 6:
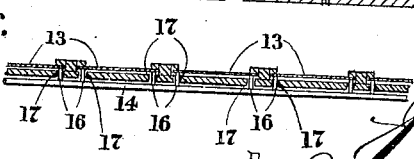

In the drawings which serve to illustrate my invention: Figure 1 is a perspective view showing the position of the conveyance, screen and biograph and also means for operating said conveyance to produce both longitudinal and lateral movements. Fig. 2 is a front end elevation with the gate representing the bow of the boat open when the conveyance is being used to represent a car. Fig. 3 is a view from the interior looking toward the front end, showing the gates representing the bow closed, with an anchor resting against same and a moving picture of a vessel, water and clouds thrown upon the screen. Fig. 4 is a perspective view of a longitudinal section of the rear end of the conveyance when used to represent a passenger car. Fig. 5 is a similar view of the same when transformed to represent a boat. Fig. 6 is a partial section on the line *x—x* Fig. 1.

I prefer to construct, arrange and operate my device substantially as follows: A conveyance 1 made to imitate a passenger car having suitable wheels 2 mounted upon a short track 3 having curved ends or stops 4 to limit the endwise movement of the car and having suitable notches 5 upon the upper surface of said track to give it the natural vibration, said track being mounted upon and fixed to transversely arranged rockers 6 having operating handle 7 and stops 8 to limit the rocking movement, said rockers being supported upon a plane surface either in a tent or building or other dark inclosure, (not shown). Necessary artificial light is provided to render the objects and pictures visible.

The conveyance 1 is provided with a stationary platform 9, end 10 and entrance-door 11 and with seats 12 for the spectators. It is also provided with representations of windows 13 (Fig. 4) which are connected together by a suitable rod 14 whereby said imitation windows are adapted to be moved downwardly to form the lower part of imitation state room doors and to expose to view the upper part of said imitation state-room doors as shown in Fig. 5. Said windows are connected to said rod by fingers 16 extending through slots 17 in the side of the car and the rod is adapted to be held in its upper position by means of hooks 18 upon each side of the car.

Above the imitation windows is provided a door 19 secured at its lower edge by hinges 20 and adapted to swing outwardly and rest upon brackets 21 in order to expose to view of the spectators some of the properties ordinarily used in connection with a boat, such as the life boats 22 and the life preservers 23 which are supported adjacent the car upon each side by suitable standards 24. At the same time this change is made the closet door 25 of the car is opened and swung in front of the entrance-door 11 of the car, exposing to view of the spectators a movable stairway 26 housed therein and adapted to slide outwardly into the aisle in front of said door 25 while the gates 27 and anchor 28 are swung inwardly to the position shown in Fig. 3 to assist in making the representation of a boat. As soon as these changes from the representation of a car to the representation of a boat have been made the car is stopped at a point indicated by Fig. 1 and held from lengthwise movement by engagement of the downwardly extending catches 29 with the sliding stops 30 adapted to be moved horizontally in grooves 31 in the rockers 6. The moving pictures and other objects now thrown upon the screen are such as are adapted to represent boats, water, clouds and other appropriate coast and water scenery as shown in Fig. 3 to more completely give the impression and create the illusion upon the spectators that they are upon a boat and to make the impression more real the boat is given a tilting or rocking motion by applying the necessary power to the handle 7. The rapidly moving pictures thrown upon the screen by means of a biograph 32 or other similar instrument in connection with the actual representation of the boat having state-room doors, life-boats, life-preservers, stairway, and other features to represent a boat in connection with the actual rocking movement completes the illusion and causes the spectators to feel that they are being transported over long and delightful stretches of water and along beautiful coast scenery.

The shifting of the car windows, shown in Fig. 4, to produce imitation state-room doors, shown in Fig. 5, and the other changes from car to boat produces the effect upon the spectators of being transferred from a passenger car to the saloon of a boat having the stairway leading therefrom to the upper deck at one end and the bow of the vessel with anchor resting against it at the other with life-preservers, boats and propeller displayed in their proper positions at the sides by the dropping of the door 19 upon the brackets 21.

The rails are held from tilting movement by means of wedges 33 having a curved surface adapted to engage the rockers and a flat surface adapted to engage the plane surface which supports the rockers. The notches 5 upon the upper surface of the track 3 serve to create the vibration of a natural moving train by contact with the wheels therewith in the backward and forward movements of the car.

An important feature of my invention consists in the rapid transformation whereby the spectators are given the impression of being almost instantaneously transferred from the inside of a car into the saloon of a boat and vice versa.

It will be apparent that my invention is capable of considerable modification without material departure from the scope or spirit thereof, as for instance, I have shown and described the device as capable of longitudinal movement while being locked against lateral movement, and lateral movement while being locked against longitudinal movement, but as shown in Fig. 1 it is capable of and adapted to be given both longitudinal and lateral movements simultaneously and this combined movement will more correctly and naturally represent either an illusory car or an illusory boat than when only one of said movements is given during a given period of time.

While I have shown a simple and convenient construction adapted to be easily and quickly transformed in appearance from a car to a boat and vice versa in combination with a suitable stationary platform and moving picture device, I do not wish to be understood as limiting myself to the precise construction set forth, but

What I claim and desire to secure by Letters Patent, is:

1. A combination amusement vehicle and boat comprising a conveyance made to imitate a passenger car adapted to move and provided with suitable attachments adapted to be shifted into positions to represent a boat.

2. A combination amusement vehicle and boat comprising a conveyance made to imitate a passenger car in combination with a short track having notches upon its upper surface upon which said car is adapted to move and having upwardly curved ends or stops to limit the endwise movement of said car.

3. A combination amusement vehicle and boat comprising a conveyance made to imitate a passenger car adapted to move in combination with a track having notches upon its upper surface to engage the wheels of said car whereby the car is caused to vibrate.

4. A combination amusement vehicle and boat comprising a conveyance made to imitate a passenger car and adapted to be moved slowly forward and backward a short distance in combination with a screen adapted to have rapidly moving pictures and objects displayed thereon whereby the slow movements of the car and the rapid movement of the pictures upon the screen create the illusion that the car in which the spectators are seated is moving rapidly.

5. A combination amusement vehicle and boat comprising a conveyance made to imitate a passenger car, a track upon which said car is mounted and adapted to move, supports for said rails, catches secured to said car and stops adapted to slide in grooves in said supports to engage said catches whereby the car is held from endwise movement.

6. A combination amusement vehicle and boat comprising a conveyance made to imitate a passenger car and having a large opening in the front thereof in combination with a gate adapted to be swung out of view from the interior of said conveyance when it is used as a car and into view therefrom to form the representation of a bow of a vessel when used as a boat.

7. A combination amusement vehicle and boat comprising a conveyance made to imitate a passenger car provided with suitable attachments adapted to be shifted into positions to represent a boat in combination with a screen adapted to display moving pictures or objects thereon.

8. A combination amusement vehicle and boat comprising a conveyance made to imitate a passenger car and provided with suitable attachments adapted to be shifted into positions to represent a boat in combination with rockers upon which said conveyance is mounted and given a rocking or laterally tilting movement and a screen adapted to have moving pictures or objects displayed thereon.

9. A combination amusement vehicle and boat comprising a conveyance made to imitate a passenger car, a closet in the rear end of said car, a door in said closet adapted to be swung in front of the entrance to said car and a stairway housed in said closet and adapted to slide outwardly in front of the car entrance into the aisle of said car to imitate the stairway leading from the saloon to the upper deck of a boat.

10. A combination amusement vehicle and boat comprising a conveyance made to imitate a passenger car and provided with a door in its side, hinges upon its lower edge, means for holding said door in closed position, brackets adapted to support said door in open position, and life-boats, life-preservers and other properties supported opposite said opening.

11. A combination amusement vehicle and boat comprising a conveyance made to imitate a passenger car, a track upon which said car is adapted to move, rockers arranged transversely under and adapted to support said track and stops adapted to limit the lateral movement of said rockers.

12. A combination amusement vehicle and boat comprising a conveyance made to imitate a passenger car, imitation windows therein, means for connecting said imitation windows together by which they are adapted to be moved in unison downwardly to expose the upper end of the imitation state-room doors and to form the lower end of said doors when changing said conveyance from an imitation car to an imitation boat.

13. A combination amusement vehicle and boat comprising a conveyance made to imitate a passenger car in combination with a fixed track having its ends curved upwardly to stop said car and curved laterally to create the impression of passing over a curve.

14. A combination amusement vehicle and boat comprising a conveyance made to imitate a passenger car, a track upon which said conveyance is mounted, rockers upon which said track is fixed and wedges each having one curved and one flat surface adapted to engage said rocker and the plane surface upon which it is mounted to hold said rocker from movement and the upper surface thereof in horizontal position.

15. A combination amusement vehicle and boat comprising a conveyance made to imitate a passenger car having an opening in its front end, a gate hinged to the front end of said conveyance and adapted to be swung in front of said opening, and an anchor and chain secured to said gate in combination with moving pictures and objects representing boats and the like.

16. A combination amusement vehicle and boat comprising a conveyance made to imitate a passenger car and having an opening in its front end provided with suitable attachments adapted to be shifted into position to represent a boat, means for giving said imitation boat a rocking or laterally tilting movement and means for exposing moving pictures in front of said imitation boat for the purposes specified.

17. In a pleasure railway of the character described, a vehicle, a moving picture screen extending across the field of the vehicle and means for simultaneously imparting longitudinal and transverse vibrations to the vehicle.

18. In a pleasure railway, in combination with a moving picture screen, of a platform rockably mounted for sidewise motion, and a car body having an open end facing the screen supported on the rockable platform and having longitudinal movement thereon.

19. In theatrical apparatus, the combination with a structure having an open end, and a track, of the representation of a conveyance comprised of a movable portion and a stationary portion, wheels mounted upon the track and carrying said movable portion, and means to effect the travel of said movable portion whereby it may be moved toward or away from said stationary portion.

JOHN E. GARRETTE.

Witnesses:
JAMES N. RAMSEY,
M. E. GLASS.